United States Patent [19]
Heinrichs et al.

[11] Patent Number: 5,071,163
[45] Date of Patent: Dec. 10, 1991

[54] TELESCOPICALLY LENGTH VARIABLE STEERING COLUMN ARRANGEMENT

[75] Inventors: Heinz-Josef Heinrichs, Koblenz-Metternich; Udo Wagner, Dachsenhausen; Reiner Wendling, Koblenz, all of Fed. Rep. of Germany

[73] Assignee: Stabilus GmbH, Koblenz-Neuendorf, Fed. Rep. of Germany

[21] Appl. No.: 576,368

[22] Filed: Aug. 31, 1990

[30] Foreign Application Priority Data

Sep. 12, 1989 [DE] Fed. Rep. of Germany ....... 3930372

[51] Int. Cl.⁵ .......................... B62D 1/18; F16F 5/00; F16F 9/32
[52] U.S. Cl. .................................. 280/775; 280/777; 74/493; 188/300; 267/64.12
[58] Field of Search .................. 74/493; 280/775, 777; 267/64.12; 188/300

[56] References Cited

U.S. PATENT DOCUMENTS

| | | |
|---|---|---|
| 3,570,832 | 3/1971 | Ortheil . |
| 4,516,440 | 5/1985 | Nishikawa ............................ 74/493 |
| 4,662,616 | 5/1987 | Hennells ........................... 267/64.28 |
| 4,785,921 | 11/1988 | Hosan et al. ......................... 188/300 |

FOREIGN PATENT DOCUMENTS

| | | |
|---|---|---|
| 317791 | 10/1988 | European Pat. Off. . |
| 2417543 | 10/1975 | Fed. Rep. of Germany . |
| 264894 | 5/1989 | Fed. Rep. of Germany . |
| 3740669 | 6/1989 | Fed. Rep. of Germany . |
| 3902882 | 8/1990 | Fed. Rep. of Germany . |
| 381005 | 12/1907 | France . |

OTHER PUBLICATIONS

Soviet Inventions Illustrated, week 84/09, section P,Q: General/Mechanical, Abstract No. 84-055112/09, Derwent Publications Ltd., London, GB; & SU-A-1015 154 (Forge Press Equip.) 30-04-1983 (Abstract; figure).

Primary Examiner—Kenneth R. Rice
Assistant Examiner—Paul Dickson
Attorney, Agent, or Firm—Brumbaugh, Graves, Donohue & Raymond

[57] ABSTRACT

A steering column of a motor vehicle is composed of two telescopically and torque transmittingly interengaging steering column tubes. These tubes are mounted in bearings. A steering wheel is allocated to a first steering column tube. The other steering column tube is connected with a steering gear box. A cylinder piston device is provided within at least one of the two steering column tubes. This cylinder piston device can be locked in a plurality of positions, such as to define a plurality of variable lengths of the steering column.

17 Claims, 4 Drawing Sheets

TELESCOPICALLY LENGTH VARIABLE STEERING COLUMN ARRANGEMENT

BACKGROUND OF THE INVENTION

It is desirable to have telescopically length variable steering columns in motor vehicles for adapting the length of the steering column to the body size of the respective driver.

STATEMENT OF THE PRIOR ART

In the German Patent Application P 39 02 882.8 (published after Sept. 12, 1989), it was suggested to provide a hydraulically blockable gas spring as a positioning device for the length adjustment of a steering column in a motor vehicle.

OBJECT OF THE INVENTION

It is an object of the present invention to provide a length variable steering column with hydraulic locking means such that these hydraulic locking means are integrated into the steering column and that no lateral parts project beyond the steering column.

A further object of the present invention is to provide a steering column of adjustable length which can be easily manufactured with a minimum of costs.

A further object of the present invention is to provide a steering column which is adapted to transmit even high steering torques.

SUMMARY OF THE INVENTION

A telescopically length variable steering column arrangement for a motor vehicle has an axis and comprises at least two telescopically and torque transmittingly interengaging steering column elements. These steering column elements are rotatably mounted in a bearing system of the body work of the motor vehicle. A steering wheel is allocated to a first one of said steering column elements for common rotation therewith, and connection means are allocated to a second one of said steering column element for being connected with steering gear means. The steering gear means are provided for effecting the steering movement of the vehicle wheels. A fluid operated locking system is provided within at least one of said at least two steering column elements for locking the steering column elements in a plurality of selectable relative axial positions. The locking means comprise locking valve means and a locking control element operatively connected with the locking valve means.

With a steering column arrangement of the present invention, the majority of parts of the fluid operated locking system are housed within the steering column. There are no laterally projecting parts. The column has therefore a good appearance. No housing means are necessary for accommodating laterally projecting parts. There is no danger of injury in the event of an accident.

The steering column arrangement has a first end portion adjacent the steering wheel and a second end portion adjacent the steering gear means. The locking control element may be preferably located adjacent the first end of the steering column arrangement, and this means that the locking control element may be located in the central area of the steering wheel. If an actuating device of a signal horn is located in this central area of the steering wheel, it is easy to provide a transmission means extending from the central area of the steering wheel to an excentrically located control element.

According to a preferred embodiment, the fluid operated locking system comprises a cylinder having an axis and two ends and defining a cavity therein. A piston rod unit extends through at least one of the two ends. A piston unit is connected with the piston rod unit within the cavity and separates two working chambers within the cavity from each other. Passage means are provided for interconnecting the working chambers, and locking valve means are allocated to the passage means. Such a fluid operated locking system is readily available in the market, e.g. in form of gas spring and hydraulic locking units or hydropneumatic locking units.

When the fluid operated locking system is in the form of a cylinder piston device, the cylinder member may act as one of the steering column elements, and a tube member may be non-rotatably guided on the cylinder member and act as the other one of the steering column elements. In this case, the piston rod unit may be operatively connected with this tube member.

Due to the fact that the cylinder member fulfills the function of one of the telescopic steering column elements, a very compact steering column is obtained with a minimum of components.

The tube member may be operatively connected with the steering wheel, whereas the cylinder member is operatively connected with the steering gear means. In this case, the locking control element may be provided adjacent an end portion of the piston rod unit and adjacent the steering wheel. E.g., the piston rod unit may be provided with a hollow piston rod, and the locking control element may be provided at the outer end of this piston rod. Such, the movement of the locking control element on actuation thereof may be transmitted through the bore of the piston rod to the locking valve means which may be provided adjacent the piston unit.

Alternatively, the cylinder member may be operatively connected adjacent a bottom end thereof with a steering wheel. In this case, the tube member will be operatively connected with the steering gear means, and the locking control element may be provided adjacent the bottom end of the cylinder member.

When the cylinder member acts as one of the steering column elements, this cylinder member is provided with torque transmission means engaging complementary torque transmission means of the tube member. These torque transmission means may be shaped in the cylinder member itself. Alternatively, it is possible also that the cylinder member is surrounded by a torque transmitting sleeve non-rotatably connected with the cylinder member and that this torque transmitting sleeve is provided with torque transmission means engageable with complementary torque transmission means of the tube member.

The torque transmission means and the complementary torque transmission means may be provided by axially extending spline means which provide a low resistance against telescoping of the cylinder member and the tube member with respect to each other.

The complementary torque transmission means of the tube member may be provided by a torque transmission ring member fixed to an end portion of the tube member. This facilitates the manufacturing of the complementary torque transmission means and helps to lower the manufacturing costs.

Besides the possibility of using the cylinder member as one of the steering column elements, there exists also the possibility that the steering column elements are provided by two steering column tubes providing a hollow space therein. In this case, the cylinder member and the piston rod unit of the cylinder piston device may be housed within this hollow space and one of the steering column tubes may be operatively connected with the piston rod unit, whereas the other one of the steering column tubes is operatively connected with the cylinder member. In this case, the steering column tubes are provided with respective torque transmission means, and these torque transmission means may again be spline means.

The steering column elements may be rotatably mounted within an external bearing tube. Such an external bearing tube is of particular interest, if it is desired also to selectively vary the inclination of the steering column with respect to the body work of the motor vehicle.

Irrespective of the existence or non-existence of an external bearing tube, the first steering column element may be slidingly and rotatably mounted within a first bearing unit, whereas the second steering column element may be rotatably mounted and axially supported by a second bearing unit.

It is desirable that a telescopically length variable steering column is unlocked for a reduction of its axial length in case of an accident. This may be achieved in that the fluid operated locking system is provided with securing means unlocking the steering column elements in a respective position in response to a predetermined axial load. If the fluid operated locking system comprises at least two working chambers the respective volumes of which are variable in response to relative axial movement of the steering column elements, at least one of the working chambers may be provided with an escape opening. This escape opening may be provided with emergency closure means. These emergency closure means may be provided for opening under a predetermined axial load on the steering column elements.

The fluid operated locking means may be combined with biasing means biasing the steering column elements towards a terminal relative position such that the steering column elements move towards said terminal relative position in response to opening the locking valve means. E.g., it is possible that the steering column is under prestress such that on opening the locking valve means, the steering column is automatically adjusted to its maximum length. In this case, the driver who wants to lengthen the steering column must only actuate the locking control element and wait for the automatic increase of length, until the desired length value is obtained. In this moment, the driver has to stop actuation of the locking control element. Alternatively, it is also possible to integrate the biasing means such that on releasing the locking system, the length of the steering column is automatically shortened.

The biasing means may comprise a volume of pressurized gas, such as it is known from gas springs and hydropneumatic locking elements.

The fluid operated locking system may comprise a volume of locking liquid in at least two working chambers separated from each other by said locking valve means.

The fluid operated locking system may also be used for a damping movement of the steering column in case of an accident.

The various features of novelty which characterize the invention are pointed out with particularity in the claims annexed to and forming a part of the disclosure. For a better understanding of the invention, its operating advantages and specific objects attained by its use, reference should be had to the accompanying drawings and descriptive methods, in which there are illustrated and described preferred embodiments of the invention.

BRIEF DESCRIPTION OF THE DRAWINGS

The invention will be explained in greater detail hereinafter with reference to embodiments shown in the accompanying drawings in which.

DESCRIPTION OF THE PREFERRED EMBODIMENTS

Figures 1, 2:
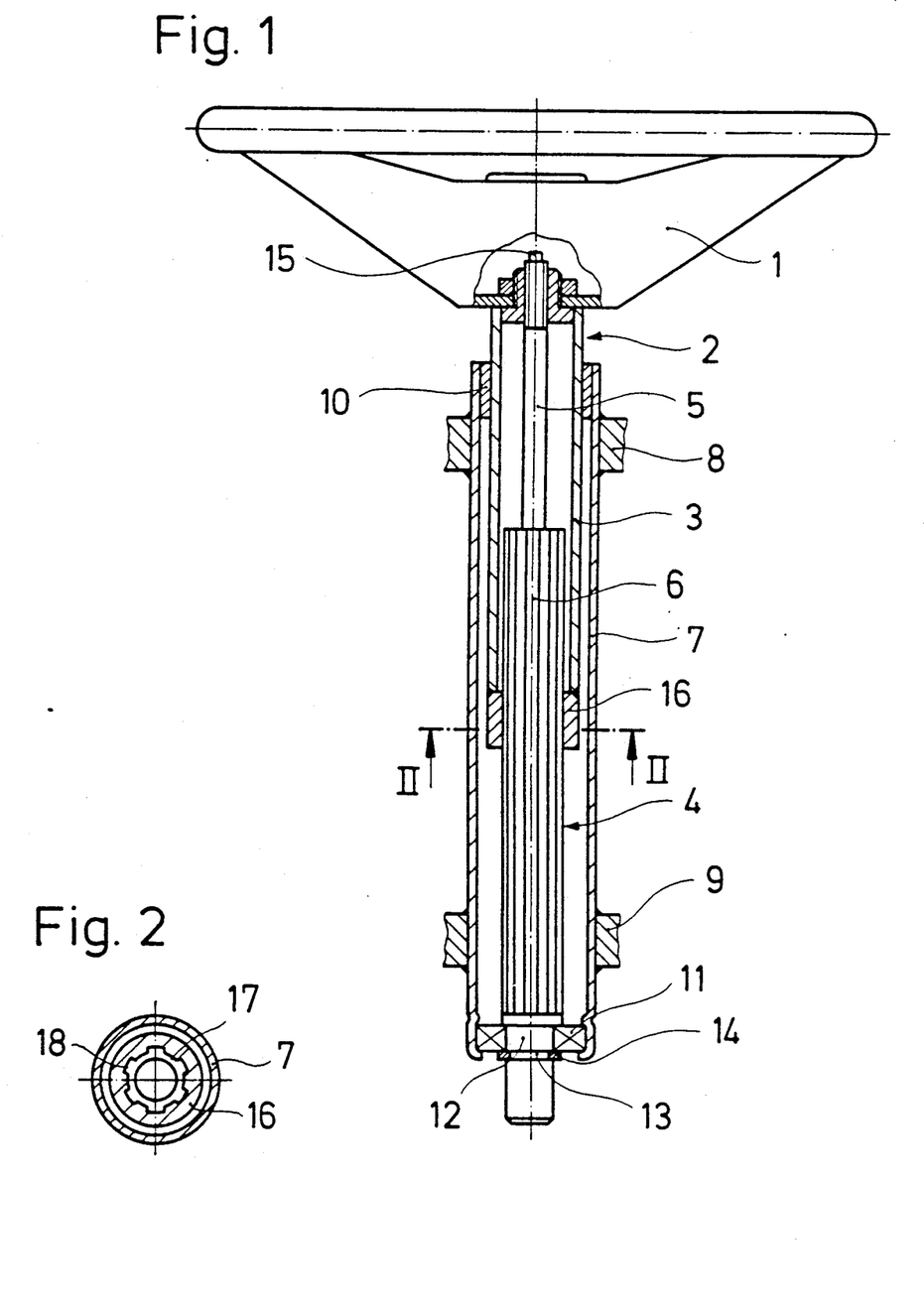
FIG. 1 shows a longitudinal section through a first embodiment of a steering column arrangement according to the present invention.
FIG. 2 shows a section according to line II—II of FIG. 1.

The steering column 2 shown in FIG. 1 comprises a tube member 3, which at its upper end is rigidly connected with a steering wheel 1. The steering column 2 further comprises a cylinder 6 of a hydropneumatic adjusting element 4. A piston rod 5 of this hydropneumatic adjusting element 4 is connected with the upper end of the tube member 3 in the area of the steering wheel 1. The cylinder 6 of the hydropneumatic adjusting element 4 is in telescopic engagement with the tube member 3 so that the tube member 3 is axially slidable with respect to the cylinder 6, and a steering torque can be transmitted from the steering wheel 1 through the tube member 3 to the cylinder 6. The length of the steering column 2 is variable by axially sliding the tube member 2 with respect to the cylinder member 6. A torque transmitting ring 16 is fixed to the lower end of the tube member 3. This torque transmitting ring 16 is provided with axially extending groove means 18 interengaging with complementary axially extending spline means 17 of the cylinder member 6. The spline means of the cylinder member 6 may either be directly shaped into the wall of the cylinder member or may be provided on a sleeve surrounding the cylinder 6 and fixed with respect to the cylinder both in axial and circumferential direction.

To accommodate the steering column 2, which consists of the tube member 3 and the cylinder member 6, an external tube 7 is provided which is fixed on parts 8 and 9 which are rigid with the body work of the motor vehicle. Alternatively, the external tube 7 may also be tiltable and fixable in various tilting positions with respect to the body work. A bearing bush 10 is fixed in the external tube 7 near the upper end thereof. In this bearing bush 10, the tube member 3 is axially slidable and rotatable. A further bearing 11 is provided at the lower end of the external tube 7 and is fixed in this external tube. A stud-like connection part 12 is connected with a bottom plate of the cylinder 6. This stud-like connection part is rotatably mounted and axially fixed by the lower bearing 11 within the stationary external tube 7. The axial fixation is obtained by a locking ring 14 engaging a groove 13 of the stud-like connection part 12. Thus, axial forces from the cylinder 6 are transmitted to the external tube 7 via the bearing 11.

The assembling of the steering column arrangement is very simple. One can enter the cylinder 6 together with the tube member 3 into the external tube 7 from the upper end thereof and thereafter fix the cylinder 6 within the bearing 11 by providing the locking ring 14. A push member 15 serves as a locking control element. This push member 15 is provided at the upper end of the hollow piston rod 5 and is located in the centre of the bearing wheel 1. This push member 15 serves to actuate a valve disposed within the hydropneumatic adjusting element 4. The push member 15 can e.g. be actuated via an actuating lever not shown in the drawings, since usually the actuating device for the signal horn is provided in the centre of the driving wheel 1.

In FIG. 1, the external tube 7 is supported by rigid parts 8 and 9 of the body work of the motor vehicle. It is easily understandable, however, that the external tube 7 could also be tiltably mounted within the body work of the motor vehicle so that the inclination of the steering column 2 could be adjusted according to the wishes of the driver.

Figure 3:
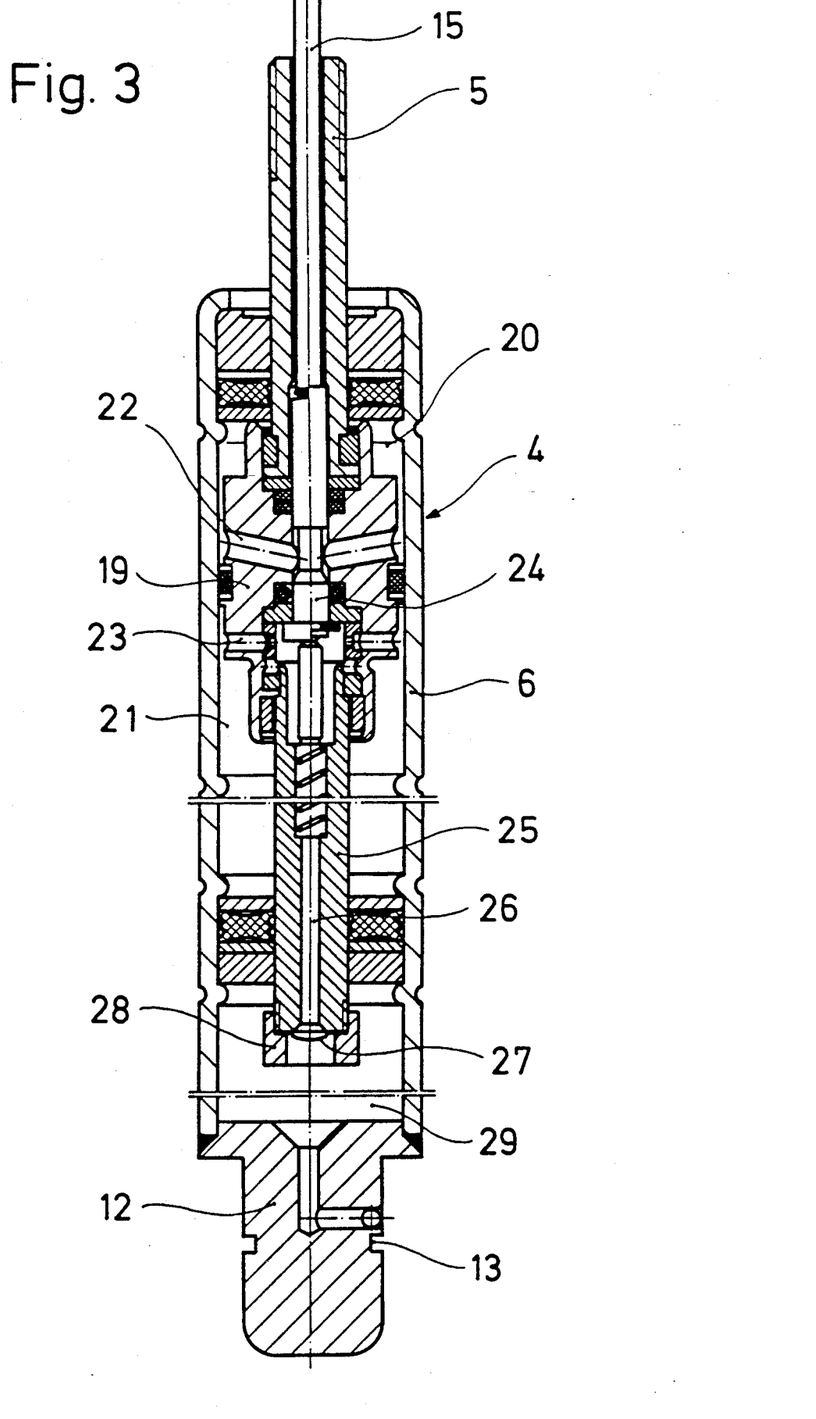
FIG. 3 shows a hydropneumatic cylinder piston device to be used as a fluid operated locking system for a steering column of the present invention.

FIG. 3 shows the adjusting element 4. The cylinder 6 is provided with longitudinal grooves or is surrounded by a sleeve which is axially and circumferentially fixed with respect to the cylinder 6, and in this case the sleeve could be provided with longitudinal grooves. At the upper end of the cylinder 6, there is provided a guiding and sealing unit for the piston rod 5. The cavity within the cylinder 6 comprises a liquid filled space, which is subdivided into two working chambers 20 and 21 by a piston 19. The piston 19 is connected to the piston rod 5. A passage 22 opens into the upper working chamber 20. This passage is provided within the piston 19. A further passage 23 is allocated to the lower working chamber 21. By means of a valve member 24 which can be actuated by the push member 15, the two passages 22 and 23 can be interconnected, such as to provide a connection between the working chambers 20 and 21. In the position of the valve member 24 shown in the drawing of FIG. 3, the adjusting element 4 is hydraulically locked, since the closed valve does not permit any communication between the passage 22 and 23. Furthermore, there is at the bottom end of the piston 19 a piston rod extension 25 which passes through a partition defining a lower chamber 29. The piston rod extension 25 enters into the pressure chamber 29 below the partition. The piston rod extension 25 is provided with a longitudinal bore 26 at the end of which a rupture disc 27 is secured by means of a fixing nut 28. The chamber 29 is filled with a pressurized gas.

As the cross-sectional area of the piston rod 5 and the cross-sectional area of the piston rod extension 25 are equal to each other, the volume within the chambers 20 and 21 is independent of the axial position of the piston rod 5 with respect to the cylinder 6. The pressurized gas within the chamber 29 exerts a biasing force onto the piston rod extension 25 and the piston rod 5 in upward direction. This means that the steering wheel is biased towards the driver body and can be pushed inwards against the biasing force, when the valve member 24 has been brought into opening position.

The pressurized gas within the chamber 29 can be avoided. E.g., one can provide an opening from the chamber 29 to atmosphere. In this case, no biasing force is acting onto the extension 25 and the piston rod 5. The opening could be made, however, with a very small cross-sectional area so that on inward movement of the piston rod 5 with respect to the cylinder 6 a damping effect is obtained.

The rupture disc 27 mounted at the lower end of the bore 26 is so designed that with effect from a predetermined pressure difference between the working chamber 21 and the chamber 29 this disc breaks so overcoming the locking effect of the adjusting element. This means that under high axial forces, the steering column collapses axially and helps to absorb energy in the case of an accident.

Normal adjustment takes place in that via an actuating lever the push member 15 is pushed downwards, and thus the valve member 24 is also pushed downwards. Thus, a connection is made between the upper working chamber 20 and the lower working chamber 21. Then the steering column 2 can be varied in its length, until the desired position of the steering wheel is reached. When the actuating lever is released, the spring force of a spring causes the valve member 24 to be pushed backwards into the position shown in the drawings so that the adjusted position of the steering wheel is fixed. Due to the axial fixing of the cylinder 6 within the external tube 7 by means of the bearing 11 and the ring member 14, the axial position of the cylinder 6 and the connecting part 12 fastened thereto are in variable position. During adjustment, there is only a relative movement between the tube member 3 and the cylinder 6 of the hydropneumatic adjusting element 4, and the steering torque can always be transmitted because the tube member 3 is in torque transmitting engagement with the cylinder 6. The connecting part 12 is in connection with a steering gear driving the wheels for steering movement.

In FIG. 4, there is again shown an external tube 107, which is fixed on parts 108 and 109 of the body work. A steering column 102 is accommodated within the external tube 107.

Figure 4:
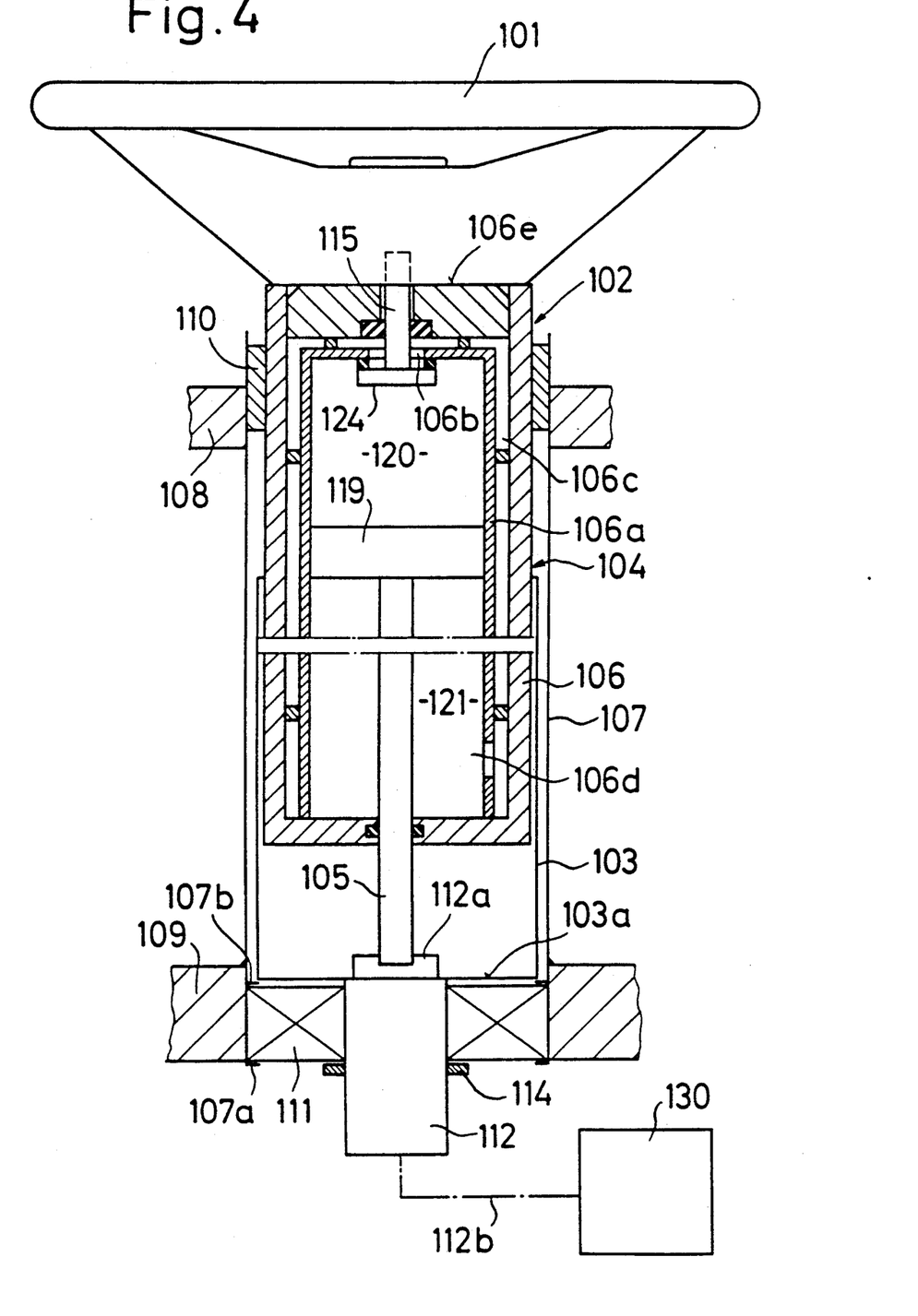
FIG. 4 shows a diagrammatic sectional view of a second embodiment of a steering column arrangement and FIG. 5 shows a diagrammatic sectional view of a third embodiment of a steering column arrangement of the present invention.

The steering column 102 comprises a gas spring 104. The gas spring 104 comprises a cylinder 106 and a piston rod 105. The piston rod 105 is combined with a piston 119. The piston 119 divides the cavity within the cylinder 106 into two working chambers 120 and 121. The working chambers 120 and 121 are housed within an inner casing 106a. The working chambers 120 and 121 are interconnectable by a passage 106b, 106c, 106d. This passage is provided with a locking valve member 124. The locking valve member 124 is biased towards the closing position as shown in FIG. 4 by the pressurized gas contained within the working chambers 120 and 121. The locking valve member 124 can be shifted into an open position by axial pressure exerted onto a push member 115. The steering wheel 101 is fastened to the upper portion or bottom portion of the cylinder 106. The cylinder 106 is rotatably and axially movably mounted by a bearing unit 110 within the external tube 107. The cylinder 106 is combined with a tube member 103. The tube member 103 is in telescopic engagement with the cylinder 106, and further the tube member 103 is in torque transmitting engagement with the cylinder 106 by spline means (not shown).

The tube member 103 is provided with a bottom part 103a. This bottom part 103a is provided with a stud-like connecting part 112 which is rotatably mounted within the external tube 107 by a lower bearing unit 111. The lower bearing unit 111 is fixed with respect to the external tube 107 by axial abutments 107a and 107b. The stud-like connecting part 112 is axially fixed with respect to the bearing unit 111 by the bottom wall 103a on the one hand and a releasable fastening ring 114 on the other hand. The piston rod 105 is axially supported by the stud-like connecting part 112 in the support socket 112a. The lower end of the stud-like connecting part 112 is connected by connection means 112b with a steering gear 130. The working chambers 120 and 121 are filled with pressurized gas. The pressurized gas biases the cylinder 106 upwards with respect to the piston rod 105. When the locking valve member 124 is brought to the opened position by actuating the push member 115, the cylinder 106 moves upwards together with the steering wheel 101. Rotation of the steering wheel 101 is transmitted to the tube member 103 and from the tube member 103 to the stud-like connecting part 112.

Alternatively, the working chambers 121 and 122 could also be filled with a liquid. In this case, it would be necessary to provide a piston rod extension extending through the upper end of the cylinder 106 as shown in FIG. 3. The valve member 124 could in such case be shifted to an excentric position.

The steering column is in the embodiment of FIG. 4 established by the cylinder 106 and by the tube member 103 which form telescopically and torque transmittingly engaging steering column elements.

Figure 5:
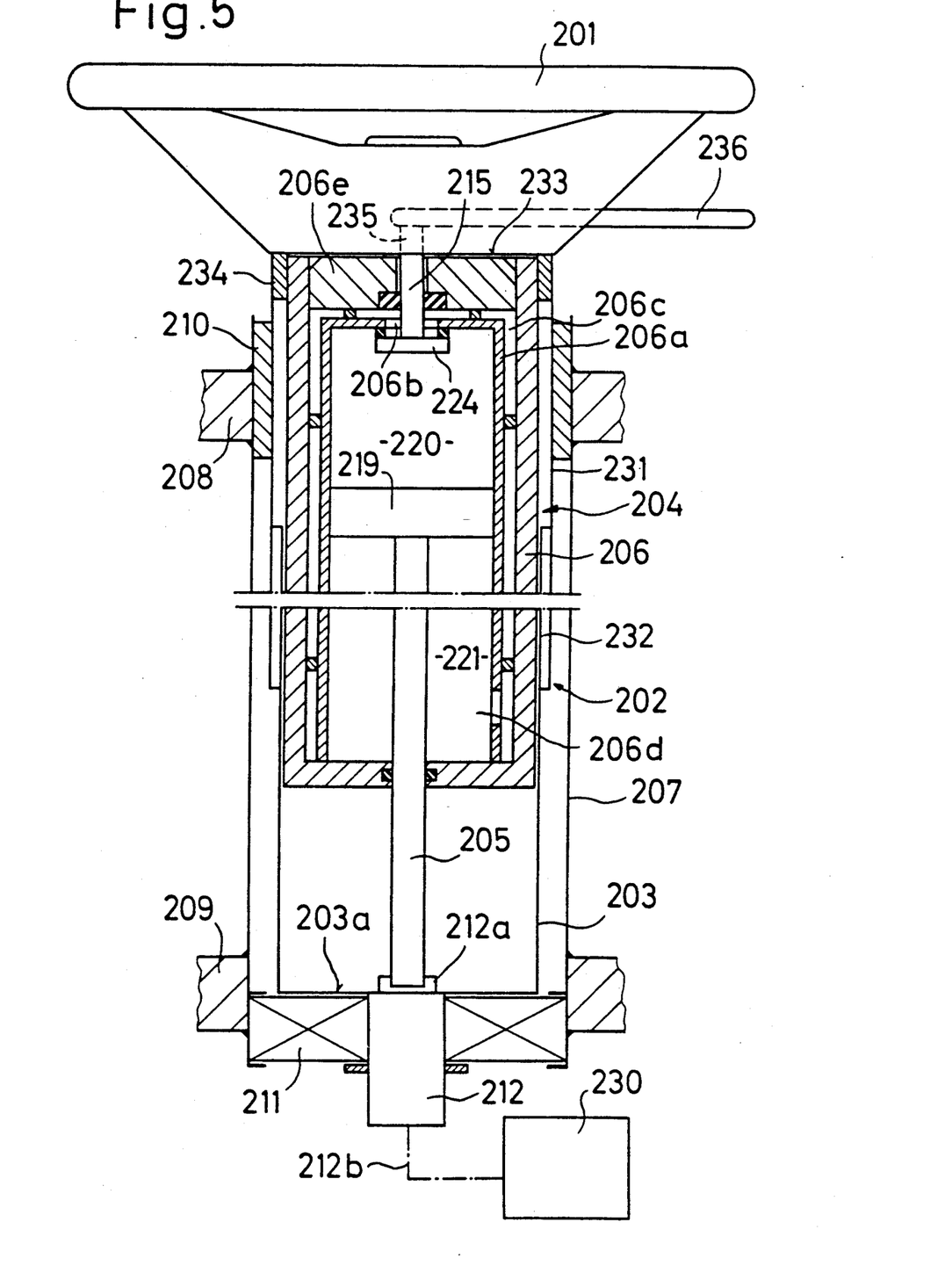

In the embodiment of FIG. 5, the gas spring 204 is substantially identic with the gas spring 104 of the embodiment of FIG. 4. Analogous parts are designated by the same reference numberal as in FIG. 4 increased by 100.

In the embodiment of FIG. 5, the steering column 202 is established by a lower tube member 203 and an upper tube member 231. The upper tube member 231 is telescopically and torque transmittingly engaged with the lower tube member 203 by axially extending spline means 232. The upper end of the upper tube member 231 is provided with an end wall 233. The upper end wall 206e of the cylinder member 206 engages the upper end wall 233 of the upper tube member 231. An adapter member 234 centres the upper end of the cylinder member 206 within the upper tube member 231. The push member 215 extends through an opening 235 of the upper end wall 233. The steering wheel 201 is fastened to the upper tube member 231. An actuating lever 236 is pivotally mounted on the steering wheel 201 and acts onto the push member 215. The steering column 202 is established in this embodiment by the telescopically and torque transmittingly engaging tube members 203 and 231.

While specific embodiments of the invention have been shown and described in detail to illustrate the application of the inventive principles, it will be understood that the invention will be embodied otherwise without departing from such principles.

The reference numerals in the claims are only used for facilitating the understanding and are by no means restrictive.

We claim:

1. A telescopically length variable steering column arrangement (2) for a motor vehicle having an axis and comprising:
    at least two telescopically and torque transmittingly interengaging steering column elements (3,6) rotatably mounted in a bearing system (10, 11);
    a steering wheel (1) allocated to a first one of said steering column elements (3,6) for connection with steering gear means;
    fluid operated locking means (4) provided within at least one of said at least two steering column elements for locking said steering column elements (3,6) in a plurality of selectable relative axial positions, said locking means (4) comprising locking valve means (24) and a locking control element (15) operatively connected with said locking valve means (24) and accessible to the vehicle operator for controlling said locking valve means (24); and
    said locking control element (15) extending outwardly of said first one of said steering column elements (3,6) at a location adjacent to said steering wheel (1).

2. A telescopically length variable steering column arrangement (2) for a motor vehicle having an axis and comprising:
    at least two telescopically and torque transmittingly interengaging steering column elements (3,6) rotatably mounted in a bearing system (10, 11);
    a steering wheel (1) allocated to a first one of said steering column elements (3,6) for connection with steering gear means;
    fluid operated locking means (4) provided within at least one of said at least two steering column elements for locking said steering column elements (3,6) in a plurality of selectable relative axial positions, said locking means (4) comprising locking valve means (24) and a locking control element (15) operatively connected with said locking valve means (24) and accessible to the vehicle operator for controlling said locking valve means (24);
    said fluid operated locking means (4) further comprising a cylinder member (6) having an axis and two ends and defining a cavity therein, a piston rod unit (5,25) extending through at least one of said two ends, a piston unit (19) connected with said piston rod unit (5,25) within said cavity and separating two working chambers (20,21) within said cavity from each other, passage means (22,23) for interconnecting said working chambers (20,21), said locking valve means (24) being allocated to said passage means (22,23); and
    said cylinder member (6) acting as one of said steering column elements (3,6), a tube member (3) being non-rotatably guided on said cylinder member (6) and acting as the other one of said steering column elements (3,6), said piston rod unit (5) being operatively connected with said tube member (3).

3. A steering column arrangement as set forth in claim 2, said tube member (3) being operatively connected with said steering wheel (1), said locking control element (15) being provided adjacent an end portion of said piston rod unit (5,25) and adjacent said steering wheel (1).

4. A steering column arrangement as set forth in claim 2, said cylinder member (106) being operatively connected adjacent a bottom end (106e) thereof with said steering wheel (101), said locking control element (115) being provided adjacent said bottom end (106e) of said cylinder member (106).

5. A steering column arrangement as set forth in claim 2, said cylinder member (6) being provided with torque transmission means (17) engaging complementary torque transmission means (18) of said tube member (3).

6. A steering column arrangement as set forth in claim 2, said cylinder member (6) being surrounded by a torque transmitting sleeve non-rotatably connected with said cylinder member (6), said torque transmitting sleeve being provided with torque transmission means, said tube member (3) being provided with complementary torque transmission means (18).

7. A steering column arrangement as set forth in claim 5 or 6, said torque transmission means (17) and said complementary torque transmission means (18) being provided by axially extending spline means.

8. A steering column arrangement as set forth in claim 5, said complementary torque transmission means (18) being provided by a torque transmission ring member (16) fixed to an end portion of said tube member.

9. A telescopically length variable steering column arrangement (202) for a motor vehicle having an axis and comprising:
   at least two telescopically and torque transmittingly interengaging steering column elements (203,231) rotatably mounted in a bearing system (210, 211);
   a steering wheel (201) allocated to a first one of said steering column elements (203,206) for connection with steering gear means;
   fluid operated locking means (204) provided within at least one of said at least two steering column elements for locking said steering column elements (203,206) in a plurality of selectable relative axial positions, said locking means (204) comprising locking valve means (224) and a locking control element (215) operatively connected with said locking valve means (224) and accessible to the vehicle operator for controlling said locking valve means (224);
   said fluid operated locking means (224) further comprising a cylinder member (206) having an axis and two ends and defining a cavity therein, a piston rod unit (205) extending through at least one of said two ends, a piston unit (219) connected with said piston rd unit (205) within said cavity and separating two working chambers (220,221) within said cavity from each other, passage means (206b, 206c, 206d) for interconnecting said working chambers (220,221), said locking valve means (224) being allocated to said passage means (206b, 206c, 206d); and
   said steering column elements (203,231) being provided by two steering column tubes (203,231) providing a hollow space therein, said cylinder member (206) and said piston rod unit (205) being housed within said hollow space, one (203) of said steering column tubes (203,231) being operatively connected with said piston rod unit (205), the other one (231) of said steering column tubes (203,231) being operatively connected with said cylinder member (206).

10. A steering column arrangement as set forth in claim 9, said steering column tubes (203,231) being provided with respective torque transmission means (232).

11. A steering column arrangement as set forth in claim 10, said torque transmission means (232) comprising spline means.

12. A telescopically length variable steering column arrangement (2) for a motor vehicle having an axis and comprising:
   at least two telescopically and torque transmittingly interengaging steering column elements (3,6) rotatably mounted in a bearing system (10, 11);
   a steering wheel (1) allocated to a first one of said steering column elements (3,6) for connection with steering gear means;
   fluid operated locking means (4) provided within at least one of said at least two steering column elements for locking said steering column elements (3,6) in a plurality of selectable relative axial positions, said locking means (4) comprising locking valve means (24) and a locking control element (15) operatively connected with said locking valve means (24) and accessible to the vehicle operator for controlling said locking valve means (24); and
   said fluid operated locking means (4) further comprising securing means (26,27) for unlocking said steering column elements (3,6) in a respective relative position thereof in response to a predetermined axial load.

13. A telescopically length variable steering column arrangement (2) for a motor vehicle having an axis and comprising:
   at least two telescopically and torque transmittingly interengaging steering column elements (3,6) rotatably mounted in a bearing system (10, 11);
   a steering wheel (1) allocated to a first one of said steering column elements (3,6) for connection with steering guide means;
   fluid operated locking means (4) provided within at least one of said at least two steering column elements for locking said steering column elements (3,6) in a plurality of selectable relative axial positions, said locking means (4) comprising locking valve means (24) and a locking control element (15) operatively connected with said locking valve means (24) and accessible to the vehicle operator for controlling said locking valve means (24); and
   said fluid operated locking means (4) further comprising at least two working chambers (20,21) the respective volumes of which are variable in response to relative axial movement of said steering column elements (3,6), at least one (21) of said working chambers (20,21) being provided with an escape opening (26), said escape opening (26) being provided with emergency closure means (27), said emergency closure means (27) being adapted for opening under a predetermined axial load on said steering column elements (3,6).

14. A telescopically length variable steering column arrangement (2) for a motor vehicle having an axis and comprising:
   at least two telescopically and torque transmittingly interengaging steering column elements (3,6) rotatably mounted in a bearing system (10, 11);
   a steering wheel (1) allocated to a first one of said steering column elements (3,6) for connection with steering gear means;
   fluid operated locking means (4) provided within at least one of said at least two steering column elements for locking said steering column elements (3,6) in a plurality of selectable relative axial positions, said locking means (4) comprising locking valve means (24) and a locking control element (15) operatively connected with said locking valve means (24) and accessible to the vehicle operator for controlling said locking valve means (24); and
   means biasing said steering column elements (3,6) towards a terminal relative position such that said steering column elements (3,6) move towards said terminal relative position in response to the opening of said locking valve means (24).

15. A steering column arrangement as set forth in claim 14, said biasing means (29) comprising a volume of pressurized gas.

16. A steering column arrangement as set forth in claim any one of claims 1, 2, 9, 12, 13 or 14, said steering column elements (3,6) being rotatably mounted within an external bearing tube (207).

17. A steering column arrangement as set forth in claim any one of claims 1, 2, 9, 12, 13 or 14, said first steering column element (3) being slidingly and rotatably mounted within a first bearing unit (10), said second steering column element (6) being rotatably mounted and axially supported by a second bearing unit (11).

* * * * *